US011863293B2

(12) United States Patent
Wiler et al.

(10) Patent No.: US 11,863,293 B2
(45) **Date of Patent: *Jan. 2, 2024**

(54) SYSTEM AND METHOD OF PROVIDING CONTENT TO A BROADCAST NETWORK

(71) Applicant: WESTWOOD ONE, LLC, Atlanta, GA (US)

(72) Inventors: Eric M. Wiler, Highlands Ranch, CO (US); Kelly G. Kittleson, Aurora, CO (US); Franklin L. Camp, Lone Tree, CO (US)

(73) Assignee: WESTWOOD ONE, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,093

(22) Filed: May 16, 2022

(65) Prior Publication Data

US 2022/0278763 A1 Sep. 1, 2022

Related U.S. Application Data

(63) Continuation of application No. 16/953,885, filed on Nov. 20, 2020, now Pat. No. 11,349,584.

(60) Provisional application No. 62/938,905, filed on Nov. 21, 2019.

(51) Int. Cl.
*H04H 60/06* (2008.01)
*H04H 20/38* (2008.01)

(52) U.S. Cl.
CPC ............ *H04H 60/06* (2013.01); *H04H 20/38* (2013.01)

(58) Field of Classification Search
CPC ......... H04H 20/06; H04H 20/38; H04H 60/06
USPC ............................ 455/3.01; 725/50; 707/222
See application file for complete search history.

(56) References Cited

U.S. PATENT DOCUMENTS

| | | | | |
|---|---|---|---|---|
| 6,437,802 | B1 * | 8/2002 | Kenny | H04H 60/06 725/50 |
| 7,274,906 | B1 | 9/2007 | Nguyen et al. | |
| 7,412,203 | B2 | 8/2008 | Valley et al. | |
| 7,860,448 | B2 | 12/2010 | Skallen | |
| 8,412,203 | B2 | 4/2013 | Ricci et al. | |
| 8,533,767 | B1 | 9/2013 | Tsang | |
| 9,136,956 | B2 * | 9/2015 | Black | H04H 60/63 |
| 11,349,584 | B2 * | 5/2022 | Wiler | H04H 20/06 |
| 2002/0097733 | A1 | 7/2002 | Yamamoto | |
| 2002/0143655 | A1 | 10/2002 | Elston | |
| 2003/0005437 | A1 * | 1/2003 | Feuer | H04N 21/8173 348/E7.071 |
| 2003/0008627 | A1 | 1/2003 | Efron et al. | |
| 2003/0130887 | A1 | 7/2003 | Nathaniel | |
| 2003/0147361 | A1 | 8/2003 | Tsukidate | |
| 2005/0120377 | A1 * | 6/2005 | Carlucci | H04N 21/4316 348/E7.071 |

(Continued)

*Primary Examiner* — Tan H Trinh
(74) *Attorney, Agent, or Firm* — Merchant & Gould P.C.

(57) ABSTRACT

Methods, systems and computer program products are provided for prioritizing content delivery. Content files associated with one of a plurality of content types are received and saved in one of a plurality of delivery queues according to the content type of the content file where each delivery queue is associated with a priority. In turn, the content files saved in the plurality of delivery queues are delivered over one or more networks to one or more affiliate systems. The transmission order of the content files is based on the priority of the delivery queue.

20 Claims, 9 Drawing Sheets

(56) References Cited

U.S. PATENT DOCUMENTS

| | | | | |
|---|---|---|---|---|
| 2005/0159104 | A1* | 7/2005 | Valley | H04H 60/06 455/3.01 |
| 2009/0122766 | A1 | 5/2009 | Hughes | |
| 2009/0327079 | A1 | 12/2009 | Parker | |
| 2012/0089699 | A1* | 4/2012 | Cholas | H04L 63/102 709/217 |
| 2013/0024875 | A1 | 1/2013 | Wang | |
| 2013/0145399 | A1 | 6/2013 | Wodka | |
| 2014/0317095 | A1* | 10/2014 | Voce | G06F 16/245 707/722 |
| 2015/0043335 | A1 | 2/2015 | Testicioglu | |
| 2015/0356621 | A1 | 12/2015 | Talansky | |
| 2016/0337919 | A1* | 11/2016 | Bindrim | H04W 36/04 |
| 2017/0011319 | A1 | 1/2017 | Elliot | |
| 2017/0187621 | A1 | 6/2017 | Shalev | |
| 2019/0173981 | A1 | 6/2019 | Chalmers | |
| 2021/0067568 | A1* | 3/2021 | Jellison, Jr. | H04L 65/40 |
| 2021/0099749 | A1 | 4/2021 | Bogatin | |

* cited by examiner

SYSTEM AND METHOD OF PROVIDING CONTENT TO A BROADCAST NETWORK

CROSS REFERENCE TO RELATED APPLICATIONS

This application is a continuation of U.S. patent application Ser. No. 16/953,885, filed Nov. 20, 2020, which claims priority to, and the benefit of, U.S. Provisional Patent Application Ser. No. 62/938,905, filed Nov. 21, 2019, which are hereby incorporated by reference in their entirety. To the extent appropriate, a claim of priority is made to each of the above disclosed applications.

TECHNICAL FIELD

Example aspects described herein relate generally to broadcast systems and more particularly to a content delivery system for reliably delivering content files to one or more affiliate systems (e.g., radio stations) via satellite only, internet only, or a combination of satellite and internet transmission mediums.

BACKGROUND

Satellite communications networks have technical limitations. Bandwidth limitations and local signal interruptions can be a significant bottleneck to satellite data delivery when used in conjunction with audio networks. Local weather conditions may also present a problem, depending on the satellite frequencies utilized. These types of interruptions can affect real-time applications like radio broadcast. The internet has speed, reliability and latency issues as well that also can affect such real-time applications. Network outages, whether satellite or internet can also delay delivery of critical content files.

Radio stations desire to play different types of content in a predetermined order and at precise times. Sometimes transmission priority needs to be modified, whether remotely at the headend side or at the affiliate system (e.g., radio station) side. One issue in accomplishing this is that neither the content creation platforms nor the radio station platforms have equipment capable of automatically sorting and prioritizing content. Nor do such platforms have the ability to control which transmission medium is used to deliver the content.

It is desirable, therefore, to provide a method and system that prioritizes and sorts content files to ensure higher priority content is prioritized and queued in a manner that facilitates timely delivery of the content regardless of whether the mode of transmission is satellite only, internet only or a combination of satellite and internet.

SUMMARY

The example embodiments described herein meet the above-identified needs by providing methods, systems and computer program products for providing content to a broadcast network.

In an example embodiment, a system for prioritizing content delivery is provided. The system includes a headend configured to: receive a plurality of content files, each of the plurality of content files associated with one of a plurality of content types; save each of the plurality of content files in one of a plurality of delivery queues according to the content type of the content file, each delivery queue associated with a priority; and deliver, over one or more networks to one or more affiliate systems, the plurality of content files saved in the plurality of delivery queues, the transmission order of the plurality of content files based on the priority of the delivery queue.

The plurality of content types can include (i) a voicetrack type, (ii) a spot type, (iii) an imaging piece type, and (iv) a music type.

The headend can further be configured to: receive a new priority level:delivery queue pair and set the priority of the corresponding delivery queue to the new priority level. In addition, the headend can be further configured to identify the content type of a content file according to a file marking associated with the content file. The headend can further be configured to save two or more of the plurality of content files in the same delivery queue, wherein the content type of the two or more of the plurality of content files are different.

The headend can further be configured to generate an inventory list of the plurality of files; deliver, over the one or more networks to one or more of the affiliate systems, the inventory list; and receive at least one of (i) a request to send one of the content files in the inventory list or (ii) a request to resend one of the content files in the inventory list.

The system can further include an affiliate system configured to substitute one of the plurality of content files with a substitute content file.

The headend can further be configured to receive a command to deliver one or more of the plurality of content files via (i) an internet channel, (ii) a satellite channel, or (iii) a combination of (i) and (ii); and deliver the one or more content files according to the command.

In an example embodiment a method for prioritizing content delivery is provided. The method includes receiving a plurality of content files, each of the plurality of content files associated with one of a plurality of content types; saving each of the plurality of content files in one of a plurality of delivery queues according to the content type of the content file, each delivery queue associated with a priority; and delivering, over one or more networks to one or more radio stations, the plurality of content files saved in the plurality of delivery queues, the transmission order of the plurality of content files based on the priority of the delivery queue.

In some embodiments, the plurality of content types include (i) a voicetrack type, (ii) a spot type, (iii) an imaging piece type, and (iv) a music type.

In some embodiments, the method further includes receiving a new priority level:delivery queue pair and setting the priority of the corresponding delivery queue to the new priority level.

In some embodiments, the method further includes identifying the content type of a content file according to a file marking associated with the content file.

In some embodiments, the method further includes saving two or more of the plurality of content files in the same delivery queue, wherein the content type of the two or more of the plurality of content files are different.

In some embodiments, the method further includes generating an inventory list of the plurality of files; delivering, over the one or more networks to one or more of the radio stations, the inventory list; and receiving at least one of (i) a request to send one of the content files in the inventory list or (ii) a request to resend one of the content files in the inventory list.

In some embodiments, the method further includes substituting one of the plurality of content files with a substitute content file.

In some embodiments, the method further includes receiving a command to deliver one or more of the plurality of content files via (i) an internet channel, (ii) a satellite channel, or (iii) a combination of (i) and (ii); and delivering the one or more content files according to the command.

In yet another embodiment, a non-transitory computer-readable medium having stored thereon sequences of instructions is provided. The sequences of instructions include instructions which when executed by one or more processors causes the one or more processors to perform the processes described herein.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Generally, the example embodiments of the invention presented herein are directed to methods, systems and computer program products for reliably delivering content files to one or more affiliates via satellite only, internet only or a combination of satellite and internet transmission mediums. Content files are delivered from a broadcast content provider to one or more affiliate systems of affiliates. Reception of all the content files that are sent is verified and any content file that has not been received is detected. Missing content files may be subsequently delivered to ensure the affiliate(s) received all the content. This description is not intended to limit the application of the example embodiments presented herein. It will be apparent to one skilled in the relevant art(s) how to implement the following example embodiments in alternative embodiments. For example, as used herein an affiliate (also sometimes referred to as network affiliate or affiliated station) is a local broadcaster, owned by a company other than the owner of the network, which carries some or all of the lineup of television programs or radio programs of a television or radio network. The example implementation described herein are directed to radio stations. However, example aspects of the embodiments herein are applicable to television stations as well. In addition, a radio station or television station that is owned by the same owner of the broadcast network is still within the scope of the invention. Further the term delivery should be understood to be interchangeable with the terms communicate, transmit and transfer and its definition is inclusive of the definitions of those terms.

Figure 1:
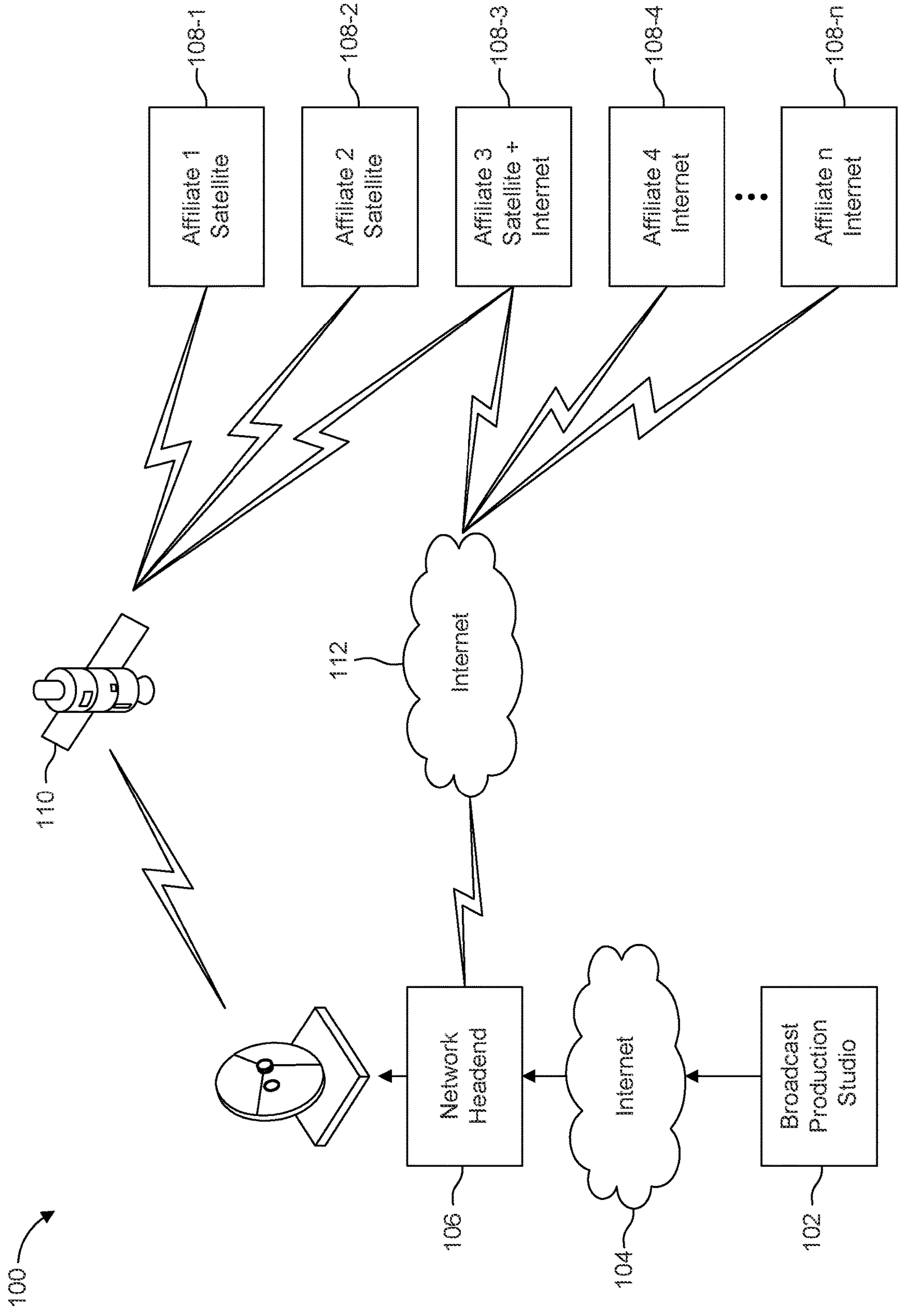
FIG. 1 illustrates an example broadcast network in accordance with an example embodiment of the present invention.

FIG. 1 illustrates an example broadcast network 100 in accordance with an example embodiment of the present invention.

Audio content is created by a studio talent in the broadcast production studio 102. After the content is recorded, a file containing the content is uploaded via a network 104, such as the public Internet, to a headend 106 of the broadcast content provider. The headend 106 processes the content file and delivers it to one or more systems of affiliates, referred to herein as affiliate systems 108-1, 108-2, 108-3, 108-4, . . . , 108-*n* (individually or collectively referred to as affiliate systems 108) by transmitting the content via a satellite-based content delivery system (e.g., via satellite 110) or a wide area network (e.g., the internet 112) as shown in FIG. 1. The broadcast network 100 can operate in three modes: satellite only, internet only, or satellite with internet backup. In an example implementation, the headend 106 can receive a command to deliver the content files via an internet channel, a satellite channel, or both via the internet channel and satellite channel. The headend 106 will, in turn, deliver the one or more content files according to the command.

The content can be provided to each of the affiliates systems 108 in the form of discrete content files. Optionally, one or more content files may be "packaged" or "encapsulated" for delivery via the satellite delivery system using satellite 110. However, what is ultimately received by each of the receivers in an affiliate system 108 is a number of discrete content files. After delivery, an automated affiliate system at each affiliate retrieves, plays and broadcasts at least some of its received content files in accordance with one or more electronic schedules. In this manner, each affiliate system 108 generates a near real-time broadcast. Each affiliate system 108 may be provided with different content files and a different electronic schedule (or schedules as the case may be).

In one embodiment of the broadcast network 100, each of the affiliates 108 is an affiliate radio station.

Figure 2:
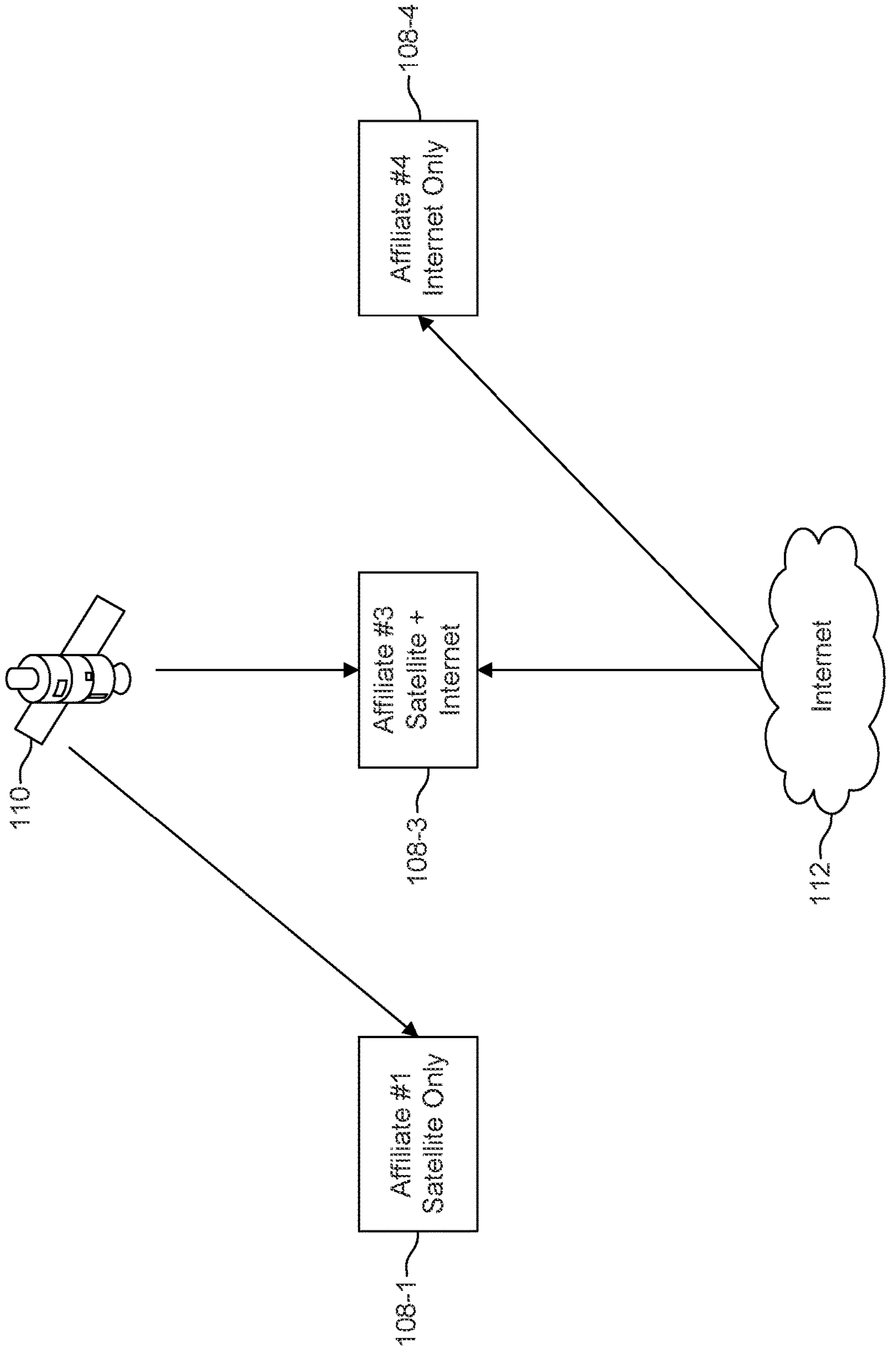
FIG. 2 illustrates an example of affiliate systems that operate in three modes according to an example embodiment of the present invention.

FIG. 2 illustrates affiliate systems 108 operating in three modes according to an example embodiment of the present invention. As shown in FIG. 2 affiliate system 108-1 operates in a satellite only mode, affiliate system 108-4 operates in an internet only mode, and affiliate system 108-3 operates in a satellite with internet backup mode.

In some embodiments, content delivered to the affiliate systems 108 are sorted by the content type and prioritized accordingly. Content types include (i) a voicetrack type, (ii) a spot type, (iii) an imaging piece type, and (iv) a music type.

Figure 3:
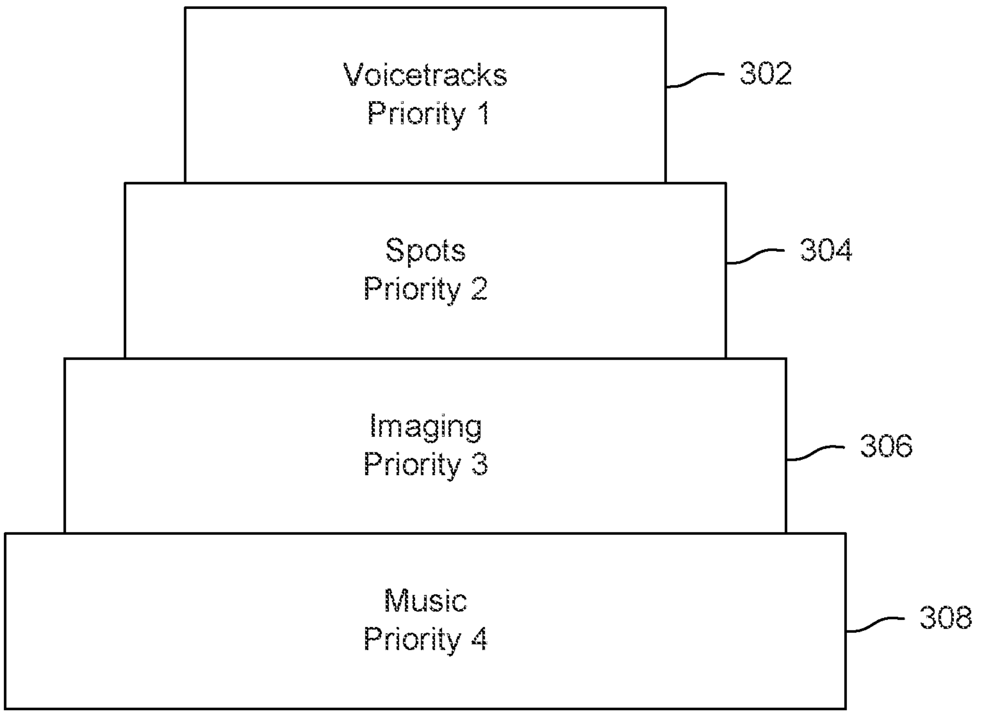
FIG. 3 illustrates delivery queues in accordance with an example embodiment of the present invention.

FIG. 3 illustrates delivery queues 302, 304, 306 and 308 in accordance with an example embodiment of the present invention. Higher priority content files are transmitted before lower priority content files. Such prioritization may facilitate ensuring timely delivery of the material. In some embodiments, the content types are sorted into a plurality of delivery queues, where each delivery queue has a certain priority. As shown in FIG. 3, the delivery queues are arranged in accordance with an example prioritization scheme. A collection of delivery queues may also be referred to herein as a single delivery queue. Accordingly, a delivery queue may be comprised of plural delivery queues.

In an example implementation, a voicetrack is a voice recording, for example, statements by a DJ, weather, news, interviews, etc. An example spot is a commercial, either a local commercial specific to the location to which the radio station broadcasts, or a network commercial that is aired to a plurality of locations by multiple radio stations. An example imaging piece can include, for example, a radio station slogan, a tagline for a specific show, or other on-air sound effects that, for example, identify a market or particular affiliate (e.g., radio station).

Figure 4:
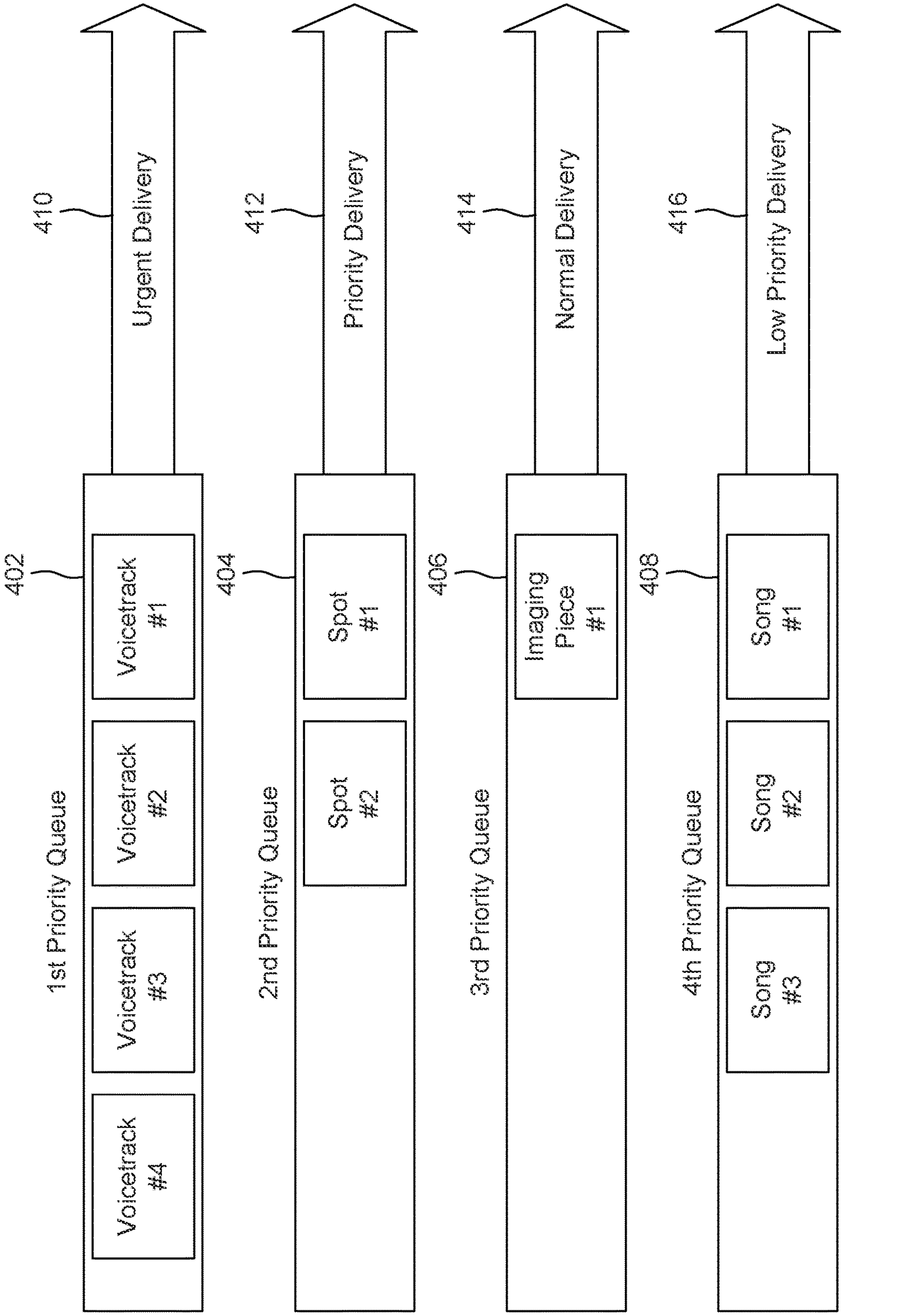
FIG. 4 illustrates prioritized delivery queues and corresponding prioritization designations in accordance with an example embodiment of the present invention.

FIG. 4 illustrates a first priority delivery queue 402, a second priority delivery queue 404, a third priority delivery queue 406 and a fourth priority delivery queue 408 each having a corresponding prioritization designation: urgent delivery 410, priority delivery 412, normal delivery 414, and low priority delivery 416, in accordance with an example embodiment of the present invention. As illustrated in FIG. 4, voicetracks have the highest priority (urgent delivery 410), and are delivered before any other content type (e.g., spots in delivery queue 404, imaging pieces in delivery queue 406, and music (e.g., songs) in delivery queue 408). The order of priority in the embodiment shown in FIG. 4 is, in higher to lower priority levels: voicetracks, spots, imaging pieces, and music (e.g., songs). Thus, regardless of content file size, the number of content files, when a content file is added to a delivery queue, etc., the content files are delivered in the order of priority as shown.

Figure 5:
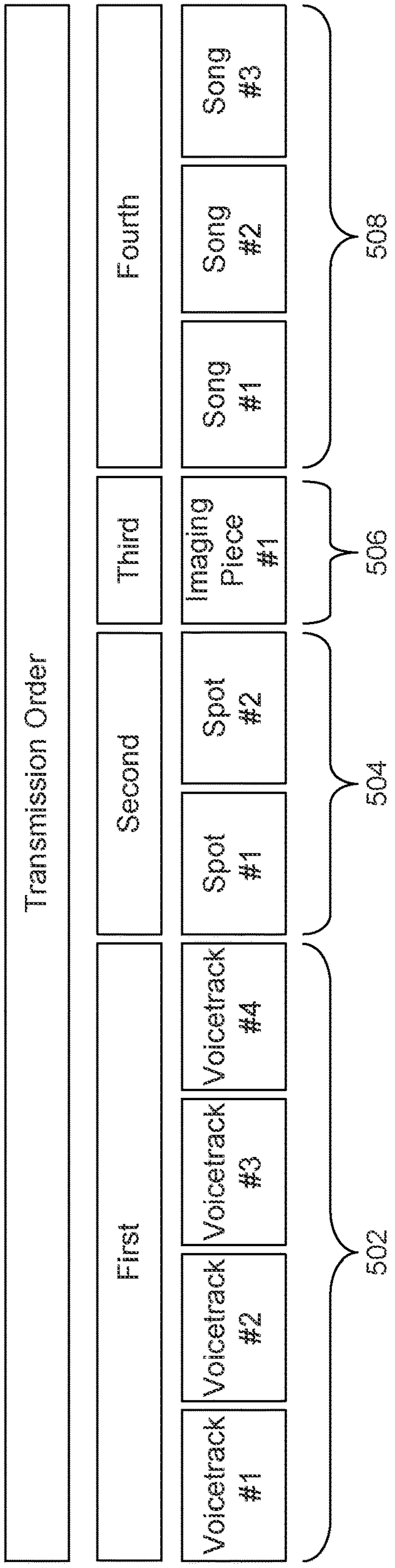
FIG. 5 illustrates delivery queues and a corresponding transmission order in accordance with an example embodiment of the present invention.

FIG. 5 illustrates delivery queues and a corresponding transmission order in accordance with an example embodiment of the present invention. In some embodiments a delivery queue contains multiple sets of content files. Each content file in a set has the same content type. In other words, content files having the same content type can be grouped together. The number of content files in each of the sets can be the same or different. Referring to both FIGS. 4 and 5, the content files (e.g., voicetrack 1, voicetrack 2, voicetrack 3, voicetrack 4, spot 1, spot 2, imaging piece 1, song 1, song 2, song 3) are delivered from the network headend (FIG. 1, 106) of the broadcast content provider to an affiliate, e.g., a radio station. In this example there are four voicetracks, two spots, one imaging piece, and three songs. Each content file is assigned a priority according to its content type and having the priority level preassigned to the content type. Once the delivery is initiated, the content files are transmitted in the order of the priority of each content file. In the example illustrated in FIGS. 4 and 5, the four voicetracks are transmitted first, then the two spots, then the one imaging piece, and then the three songs. Assigning to a content file a priority based on its content type and the priority level preassigned to its content type enables the system to ensure that higher priority content files are received first. The content files assigned a higher priority are not required to wait for all the content files in a multi-file transmission to be received together as a package. In the event of a termination of a delivery, for example as a result of a power outage, the probability is greater that the content files with a higher priority have already been received.

For example, if the content files for the songs are not received, an affiliate (FIG. 1; 108) such as a radio station may play a song content file prestored in its system instead, while playing the same voicetracks, spots, and imaging piece. If, for example, a voicetrack is the weather report, it may be difficult to replace it with a different content file since the necessary information may not be available. In contrast, if a spot content file is not received, it may be replaced with another content file having a similar content type that has been prestored on the server of the radio station. For example, a commercial can be replaced with another commercial, either for the same advertiser or for another advertiser.

In the case where the content file is a music (e.g., song) content file and the music content file is not received, the content file may be replaced with the content file containing another piece of music (e.g., another song). Listeners may not notice what happened, unlike, for example, if the weather report were missing from the program. Therefore, it may be beneficial to ensure that content files of a particular content type are received prior to other types of content files that may be more easily replaced, such as in the case of voicetracks. In some embodiments, for example, it is preferable to receive voicetracks prior to other types of content files that can be more easily replaced.

Unlike a package of content files being transmitted as a single unit, if a content provider sends additional content files while a transmission is in progress, the additional content files are integrated into the transmission in progress according to their respective priorities.

Figure 6:
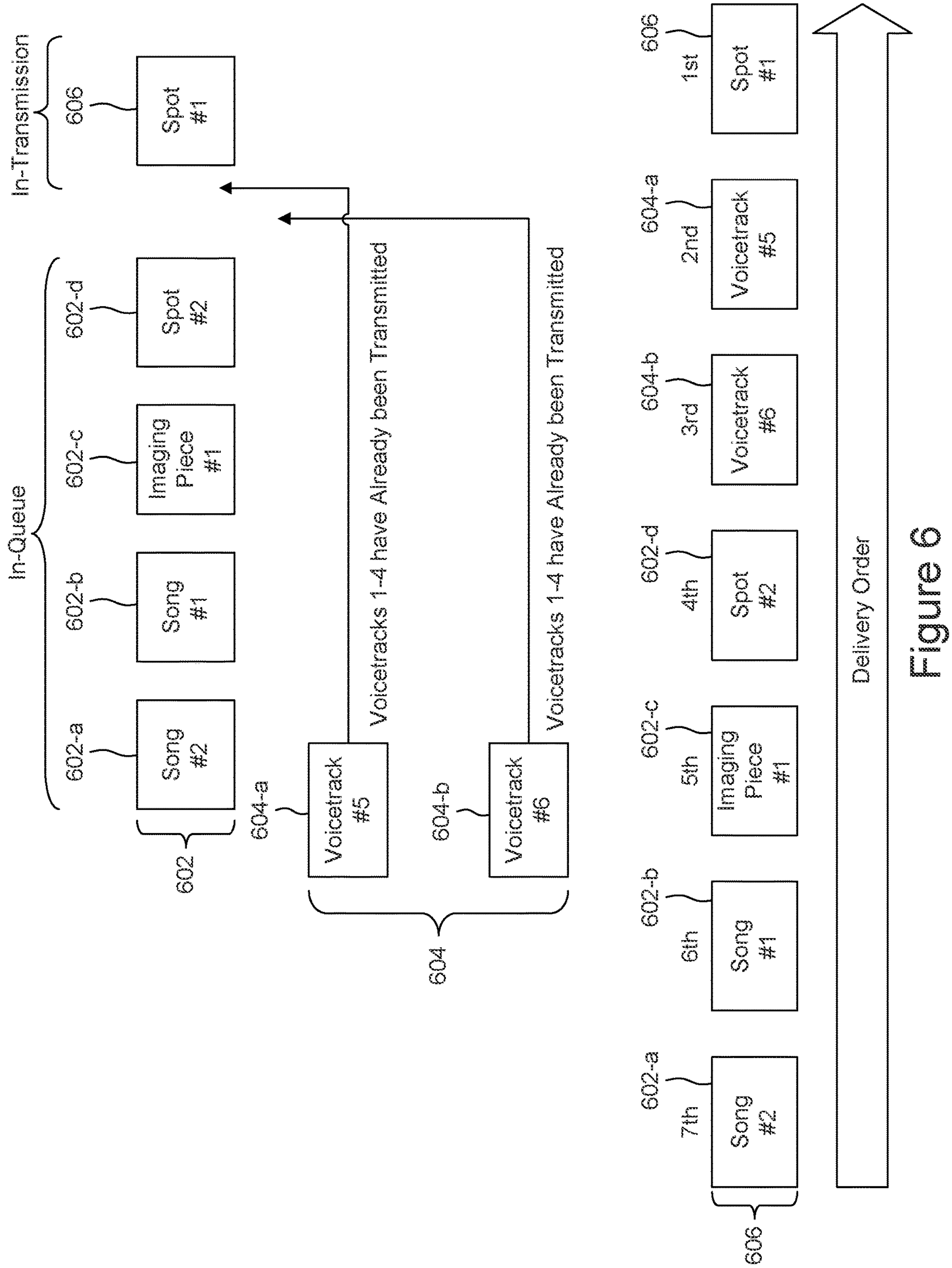
FIG. 6 illustrates a queueing process for adding additional content files to a transmission of in-queue content files according to an example embodiment of the present invention.

FIG. 6 illustrates a queueing process for adding additional content files 604 to a transmission of in-queue content files 602 according to an example embodiment of the present invention. An additional content file 604 (also referred to as "a new content file 604") is a content file that has not yet been entered into a delivery queue for transmission. An in-queue content file 602 is a content file that is in a delivery queue and awaiting its turn to be delivered according to its priority level. An in-transmission content file 606 is a content file that was previously in queue to be delivered and is now currently being delivered. In the example implementation shown in FIG. 6, one or more additional content files 604 (e.g., voicetrack #5 604-*a*, voicetrack #6 604-*b*) are added to a delivery queue by the network headend (FIG. 1, 106). The additional content files 604 are added to the delivery queue while an in-transmission content file 606 (e.g., spot #1) is in the process of being delivered. That is, while in-queue content files 602 (e.g., song #2 602-*a*, song #1 602-*b*, imaging piece #1 602-*c*, and spot #2 602-*d*) are in queue to be delivered, in-transmission content file 606 is in the process of being delivered. If a determination is made that the additional content file 604 has a higher priority than the one or more in-queue content files 602 the additional content file 604 to be inserted will be inserted at a location within the delivery queue of in-queue content files 602 according to its priority.

In an example implementation a headend 106 is configured to receive content files, where each of the content files are associated with one of several content types. The headend 106 can save each of the content files in one of several delivery queues according to the content type of the content file, where each delivery queue is associated with a priority. In turn, the headend 106 delivers, over one or more networks to one or more affiliate systems, the plurality of content files saved in the delivery queues such that the transmission order of the plurality of content files based on the priority of the delivery queue. As explained above, the content types can include a voicetrack type, a spot type, an imaging piece type, and a music type or other type of content.

As explained above in connection with FIG. 3, the delivery queues are arranged in accordance with a prioritization scheme. However, the headend 106 can also receive a new priority level: delivery queue pair and set the priority of the corresponding delivery queue to the new priority level. In other words, the prioritization scheme can be changed, for example, through a portal in communication with the headend.

Referring still to FIG. 6, an example situation might be where two voicetracks (voicetrack #5 604-*a*, and voicetrack #6 604*b*) are added while spot #1 606 is being delivered. In this example, voicetrack-type content files have the highest priority. As additional content file 604-*a* (voicetrack #5) and additional content file 604*b* (voicetrack #6) have a priority that is higher than in-queue content file 602-*d* (spot #2) which is next in queue to be delivered, both additional content files (voicetrack #5 604-*a* and voicetrack #6 604-*b*) will be added to the delivery queue after in-transmission content file 606 (spot #1) which is currently being delivered. In some embodiments, two or more additional content files are added to the delivery queue based on the priority of the additional content files. In the example shown, voicetrack #5 604-*a* is added first, then voicetrack #6 604-*b*. Likewise, if an additional content file of type spot (e.g., spot #3; not shown) were being added, the additional content file would be inserted according to its priority, which in this example is after spot #2 602-*d* and before imaging piece #1 602-*c*. Advantageously, this facilitates making programming changes and fixing errors in the programming while facilitating content file deliveries.

In another embodiment, prioritization is administered by placing each content file in one of several file directories. This step can be performed by, for example, a content creator. Which file directory a content file is placed determines the delivery queue and thus the priority level of the content file. A configuration file can be used to save a mapping of the file directories and priority levels. The priority level for each of the directories is, in turn, retrieved from the configuration file to determine the priority of the content files contained therein.

In some embodiments, a content file can include not only the content of a particular content type, but also data identifying the priority level of the content file. For example, such information, referred to herein as a file marking, can be data such as metadata, tags, file extensions, and the like. In an example implementation, headend 106 can be configured to identify the content type of a content file according to the file marking associated with the content file.

Whereas the embodiments described herein include four content types and four delivery queues, it is to be understood that more or fewer content types and delivery queues are contemplated. For example, there may be ten content types and ten delivery queues. Alternatively, more than one content type may be placed into a common directory and thus the same delivery queue. For example, there may be twelve content types and five delivery queues, wherein one or more delivery queues receive content files having a plurality of distinct content types. Alternatively, it may be desired to sort content files into different directories but place them into the same delivery queue. Then the number of directories may be greater than the number of delivery queues. The different content file types within the same delivery queue may have the same priority level or have an additional priority level within the delivery queue dictating the priority within the delivery queue.

Furthermore, whereas the order of priority in the embodiments described herein is as follows: voicetracks, spots, imaging pieces, and then music, the priority levels may be altered without deviating from the scope of the invention.

In some embodiments, the received content files are stored by an affiliate such as a radio station (FIG. 1; affiliate system 108), retrieved, played and broadcast in accordance with a schedule from the content provider. Thus, a radio affiliate's financial efficiency may be enhanced by providing them with all the content to simply broadcast without the need for the expenses of local talent for programming production. Local spots may be sent according to the region the affiliate (e.g., radio station) broadcasts to.

Directory Inventory to Verify Content File Delivery

Figure 7:
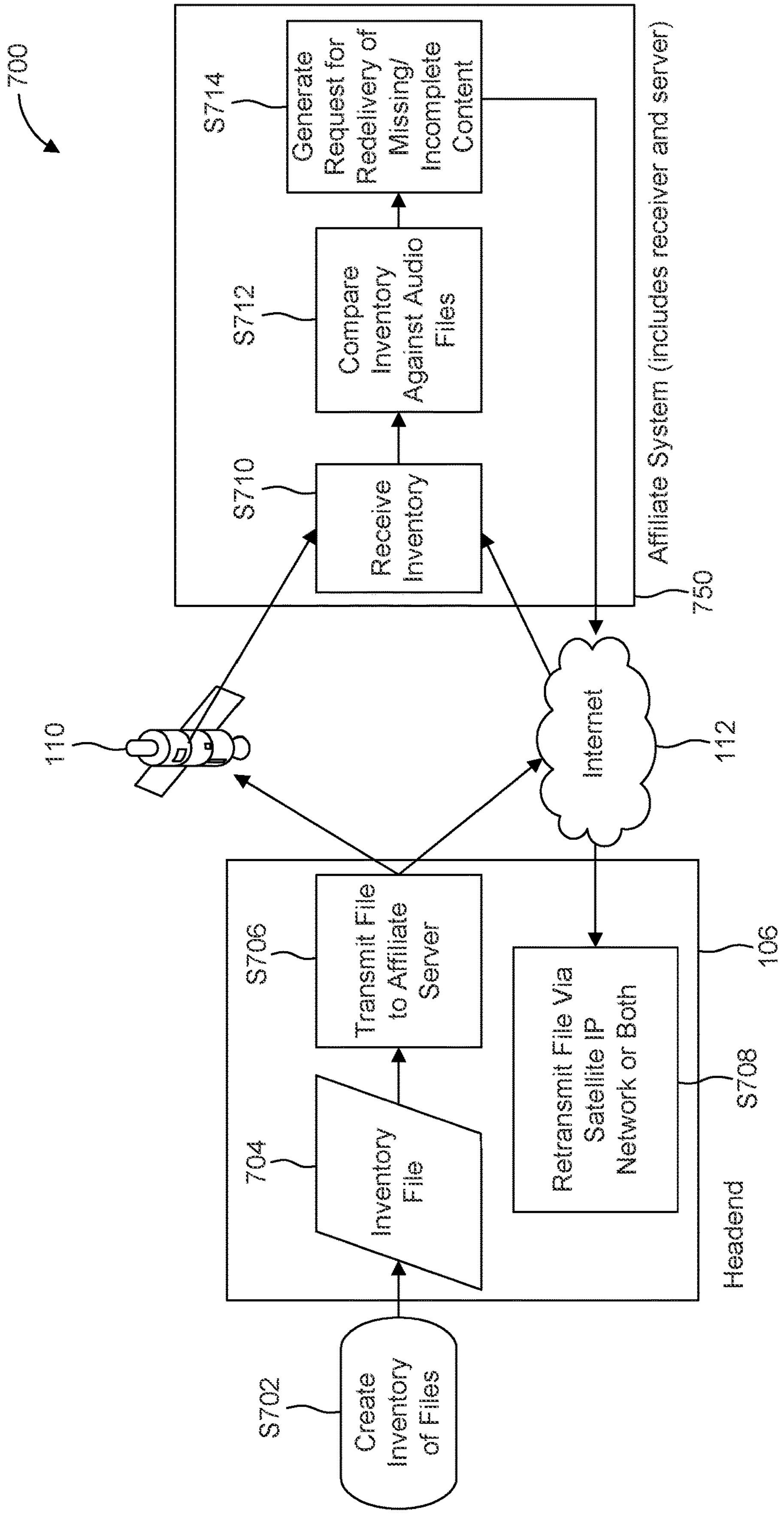
FIG. 7 illustrates a system flow diagram including a process for providing an inventory of content files to an audio server via a content delivery system in accordance with an example embodiment of the present invention.

The network headend often has many audio directories which have identical copies on the affiliate systems 108. FIG. 7 illustrates a system flow diagram including a process 700 for providing an inventory of content files 704 to an affiliate system 750 (e.g., to a receiver or server in the affiliate system) via a content delivery system in accordance with an example embodiment of the present invention. The content delivery system can utilize satellite 110 and/or the internet 112. In an example implementation, in step S702, an inventory list identifying content files that were or will be delivered to an affiliate (e.g., a radio station) are created. Step S702 can be performed, for example, by a content provider (audio asset). At step S704, the inventory list is communicated, by headend 106, to an affiliate system 108 (e.g., a radio station), for example, via satellite 110 or Internet 112, as shown in step S706. The affiliate system 750 receives the inventory at step S710. In turn, the affiliate system 750 verifies whether each of the content files in the inventory list was received. This is performed by comparing the inventory against the audio content files it has received, as shown in step S712. If a determination is made at step S712 that any content file was not received at the headend, the audio server in affiliate system 750 generates a request to send or resend the audio content file as shown in step S714. In some embodiments, another determination is made at step S712 as to whether any content file is not identical to the corresponding content file received at the headend. If not, the affiliate system 750 similarly generates a request to send or resend the audio content file as shown in step S714.

In the example shown, the request made at step S714 includes whether the retransmission of the content file should be sent via satellite, internet download, and/or direct connection to the server or CDN (content delivery network).

Preferably, the process 700 illustrated in FIG. 7 is automated, the servers on both ends communicating with each other and the headend 106 sending content files requested by affiliate system 750 automatically. Thus, if there is a power outage or other termination of the delivery of content files, once the inventory list is received, the audio server may identify which content files were not received, and request them. In accordance with an embodiment of the invention, the inventory list is sent at predetermined intervals (e.g., every night). Such a system and method may substantially eliminate the risk of human error in verifying the deliveries, and expedite the process, thus further reducing cost incurred by the radio station.

In an example implementation, headend 106 can to generate an inventory list of content files and then deliver over the satellite and/or Internet to one or more of the affiliate systems 108 (FIG. 1), the inventory list. In turn, the headend 106 can receive a request to send one of the content files in the inventory list or a request to resend one of the content files in the inventory list.

Whereas the embodiment described above provides a fully automated process in which the headend automatically sends the requested content files, alternatively, an approval process may be included. In some embodiments, the content provider may be notified of such requests as well.

A log may be created whenever requests are received from the affiliate system which may help identify faulty or unstable networks. If a certain affiliate system consistently does not receive the content files when delivered via satellite, for example, it may be preferred to make Internet transmissions their default until the problem is resolved. In some embodiments, if certain content file types or sizes tend to fail to be delivered, or transmission fails occur more frequently at certain hours, etc., the system alerts the content provider of the problem, and they may be able to address it. A system may be implanted in which if a certain affiliate system sends requests more than a predetermined number of times within a predetermined time (e.g., 5 times within a 30-day period), the content provider is notified.

Local Content File Substitution

Figure 8:
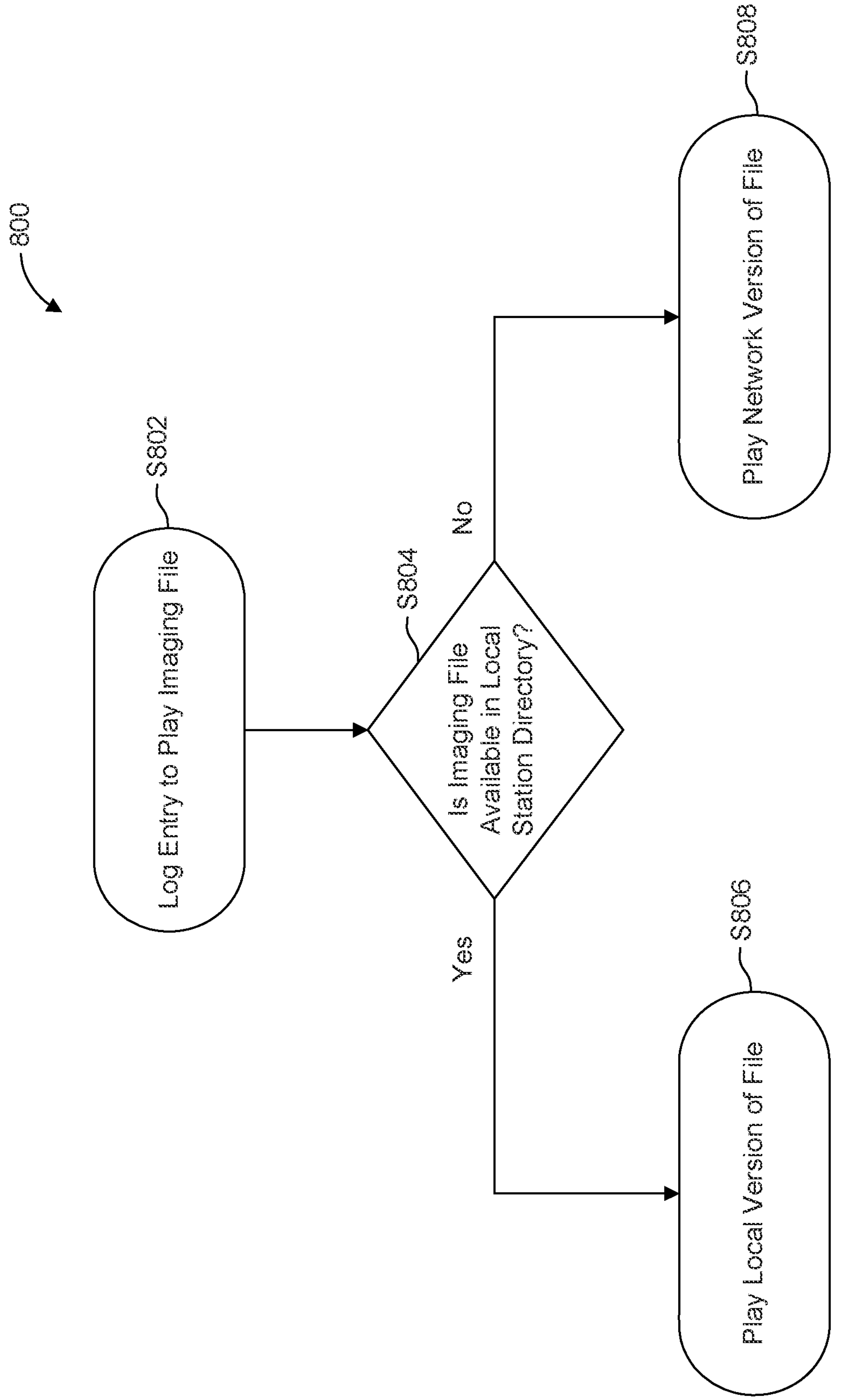
FIG. 8 provides a flowchart illustrating a process for substituting a local copy of a station imaging piece for a network imaging file in accordance with an example embodiment of the present invention.

FIG. 8 provides a flowchart of a process 800 for substituting a local copy of a station imaging piece for a network imaging content file in accordance with an example embodiment of the present invention. In some embodiments, a substitution is performed by an affiliate system. At step S802, a log entry to play an imaging content file is retrieved. If a determination is made at step S804 that an imaging content file exists in a local directory, in step S806 the local version of the content file in the local directory is played with a priority over a network-provided imaging content file. If a determination is made at step S804 that the imaging content file does not exist in the local directory, in step S808, the network version of the content file is played.

The imaging content files may have the same file name, for example, 10002.mp2. If the music log directs the affiliate system to play song A, song B, then imaging content file 10002.mp2, imaging content file 10002.mp2 is selected for example, after song B ends. This can be performed automatically or manually (e.g., by double clicking the file presented to an operator via a user interface). If the same file name 10002.mp2 exists in a directory locally accessible by the affiliate system (e.g., via a local data store), that local content file is played. If there is no content filed named 10002.mp2 in the locally accessible directory, the network version is played.

In some embodiments, the above substitution system and method may be used for other content types, and is not limited to imaging content files.

Closed Loop Method

Figure 9:
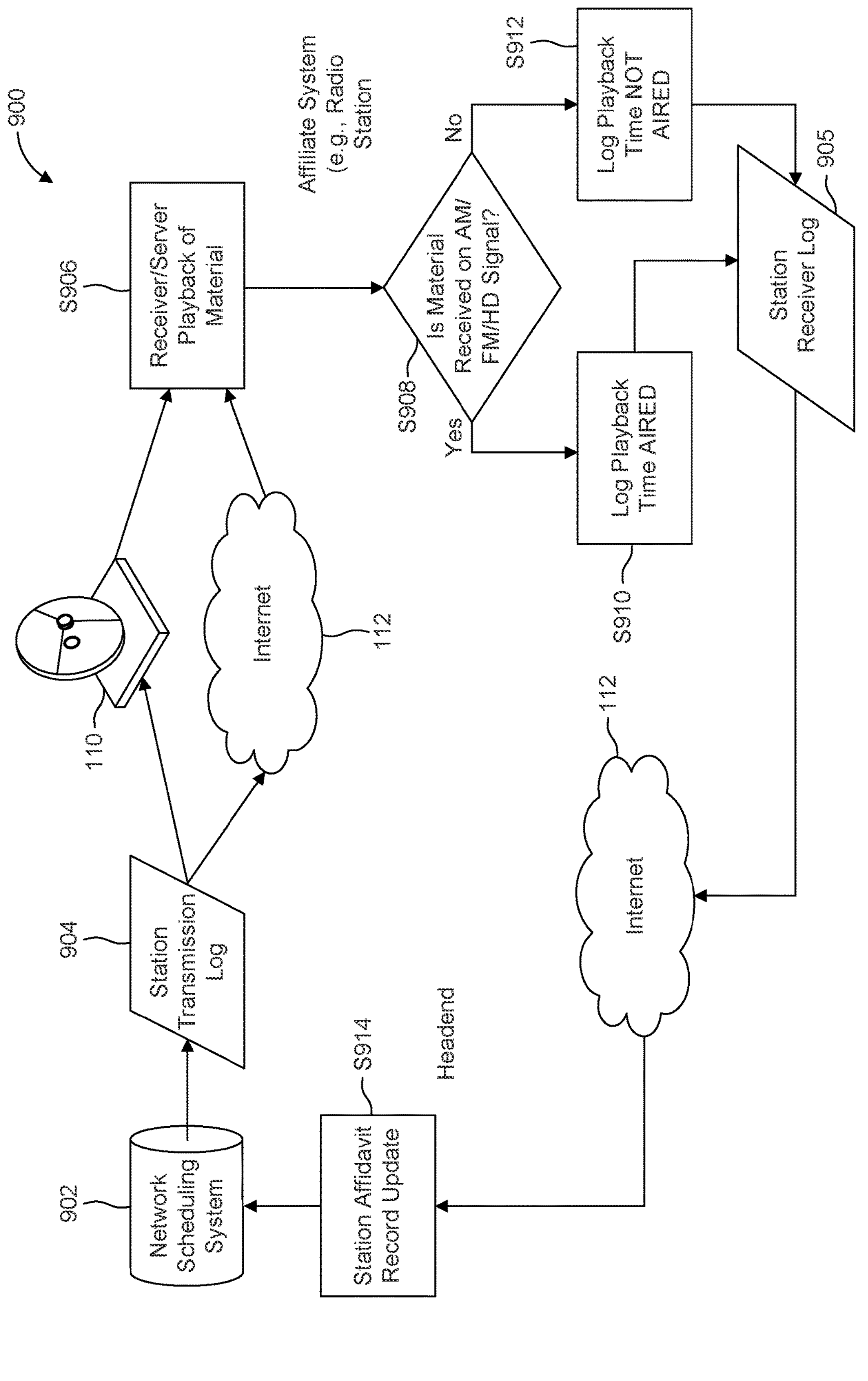
FIG. 9 illustrates a system architecture incorporating a closed-loop method for commercial scheduling, playback of a commercial by a radio station, verification of the radio station playback, and filing of a network affidavit of play to a network commercial scheduling system in accordance with an example embodiment of the present invention.

FIG. 9 illustrates a system architecture incorporating a closed-loop method 900 for commercial scheduling, playback of a commercial by an affiliate (e.g., a radio station), verification of the playback by the affiliate, and filing of a network affidavit of play to a network commercial scheduling system 902 in accordance with an example embodiment of the present invention. Radio stations, for example, are often required to submit an affidavit of play confirming a certain commercial was played on the air. This affidavit may be required for each commercial, and thus can become time-consuming and tedious. FIG. 9 illustrates an embodiment that automates the process, thus making the process more efficient, reducing error and cost by the radio station. Such a verification system may also provide an assurance to the content provider and advertiser that the commercial was in fact aired.

In the embodiment illustrated, a network scheduling system 902 sends a station transmission log 904 directing the radio station to play a certain commercial, in some cases at a certain time. The station transmission log 904 may be sent via satellite 110 and/or Internet 112. The radio station plays the content file containing commercial content as directed, as shown in S906. The affiliate system provides an AM/FM/HD tuner (not shown) (or other suitable device that hears what is aired), which determines whether or not the commercial was aired, as shown in step S908. If the tuner receives the commercial (e.g., if it "hears" the commercial being aired on a specific radio station signal) at step S908, the playback time is logged as "aired" in the station receiver log, as shown in step S910. If the tuner does not receive ("hear") the commercial content file at step S908, the commercial is logged as "not aired", as shown in step S912. The station receiver log 905 is then delivered, for example, via the Internet 112, to the content provider headend which, as shown in step S914, updates the station affidavit record and sends it to the network scheduling system 902. In some embodiments, the closed-loop method 900 is automated without the need for human action. By way of non-limiting example, the hardware of the radio station includes a tuner, which records the audio (e.g., AM/FM). The radio station is previously given the audio file for the commercial, to which the recorded audio file is compared.

The example embodiments of the invention may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX, iOS, Windows, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

Although for convenience CPU is shown as being a single CPU, in other example embodiments CPU may include plural separate CPUs, wherein each is dedicated to a separate application, such as, for example, a data application, a voice application, and a video application.

Software embodiments of the example embodiments presented herein may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms “machine accessible medium” or “machine readable medium” used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In addition, not all of the components are required to practice the invention, and variations in the arrangement and type of the components may be made without departing from the spirit or scope of the invention. As used herein, the term “component” is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-9 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for prioritizing content delivery, comprising:

a headend configured to:

receive a plurality of content files, each of the plurality of content files associated with one of a plurality of content types;

receive a prioritization scheme that details an arrangement of a plurality of delivery queues with priority levels;

set the priority levels of the delivery queues based on the prioritization scheme;

save each of the plurality of content files in one of the plurality of delivery queues according to the content type of the content file; and deliver, over one or more networks to one or more affiliate systems, the plurality of content files saved in the plurality of delivery queues, the transmission order of the plurality of content files based on the priority levels of the delivery queues.

2. The system according to claim 1, wherein:

the plurality of content types includes (i) a voicetrack type, (ii) a spot type, (iii) an imaging piece type, and (iv) a music type; and the plurality of delivery queues includes a (i) a first delivery queue having a first priority level, (ii) a second delivery queue having a second priority level, (iii) a third delivery queue having a third priority level, and (iv) a fourth delivery queue having a fourth priority level.

3. The system according to claim 2, wherein to set the priority levels of the delivery queues based on the prioritization scheme comprises to:

set the first priority level as an urgent delivery, wherein the urgent delivery is the highest priority;

set the second priority level as a priority delivery, wherein the priority delivery is a lower priority than the urgent delivery;

set the third priority level as a normal delivery, wherein the normal delivery is a lower priority than the urgent delivery and the priority delivery; and set the fourth priority level as a low priority delivery, wherein the low priority delivery is a lower priority than the urgent delivery, the priority delivery, and the normal delivery.

4. The system according to claim 3, wherein to save each of the plurality of content files in one of the plurality of delivery queues according to the content type of the content file comprises to:

save content files associated with the voicetrack type in the first delivery queue;

save content files associated with the spot type in the second delivery queue;

save content files associated with the imaging piece type in the third delivery queue; and save content files associated with the music type in the fourth delivery queue.

5. The system according to claim 4, wherein to deliver, over one or more networks to one or more affiliate systems, the plurality of content files saved in the plurality of delivery queues, the transmission order of the plurality of content files based on the priority levels of the delivery queues comprises to:

deliver the content files in the first delivery queue before the content files in the second, third, and fourth delivery queues;

deliver the content files in the second delivery queue after the content files in the first delivery queue and before the content files in the third and fourth delivery queues;

deliver the content files in the third delivery queue after the content files in the first and second delivery queues and before the content files in the fourth delivery queue; and deliver the content files in the fourth delivery queue after the content files in the first, second, and third delivery queues.

6. The system according to claim 3, wherein the headend is further configured to:

receive a new priority level:delivery queue pair; and set the priority level of the corresponding delivery queue to the new priority level.

7. The system according to claim 1, wherein the headend is further configured to:

receive an additional content file, the additional content file associated with one of the plurality of content types;

save the additional content file in one of the plurality of delivery queues according to the content type of the additional content file; and deliver, over the one or more networks to the one or more affiliate systems, the additional content file, wherein the additional content file is inserted in the transmission order based on the priority level of the delivery queue the additional content file is saved in.

8. The system according to claim 7, wherein the headend is further configured to:

generate an inventory list identifying the plurality of content files; and deliver, over the one or more networks to one or more of the affiliate systems, the inventory list.

9. The system according to claim 8, wherein the headend is further configured to:

receive at least one of (i) a request to send one of the content files in the inventory list or (ii) a request to resend one of the content files in the inventory list; and deliver, over the one or more networks to one or more of the affiliate systems, the content file associated with the request.

10. A method for prioritizing content delivery, comprising:

receiving a plurality of content files, each of the plurality of content files associated with one of a plurality of content types;

receiving a prioritization scheme that details an arrangement of a plurality of delivery queues with priority levels;

setting the priority levels of the delivery queues based on the prioritization scheme;

saving each of the plurality of content files in one of a plurality of delivery queues according to the content type of the content file, each delivery queue having a priority level; and delivering, over one or more networks to one or more affiliate systems, the plurality of content files saved in the plurality of delivery queues, the transmission order of the plurality of content files based on the priority levels of the delivery queues.

11. The method according to claim 10, wherein:

the plurality of content types includes (i) a voicetrack type, (ii) a spot type, (iii) an imaging piece type, and (iv) a music type; and the plurality of delivery queues includes a (i) a first delivery queue having a first priority level, (ii) a second delivery queue having a second priority level, (iii) a third delivery queue having a third priority level, and (iv) a fourth delivery queue having a fourth priority level, wherein setting the priority levels of the delivery queues based on the prioritization scheme comprises:

setting the first priority level as an urgent delivery, wherein the urgent delivery is the highest priority, setting the second priority level as a priority delivery, wherein the priority delivery is a lower priority than the urgent delivery, setting the third priority level as a normal delivery, wherein the normal delivery is a lower priority than the urgent delivery and the priority delivery, and setting the fourth priority level as a low priority delivery, wherein the low priority delivery is a lower priority than the urgent delivery, the priority delivery, and the normal delivery.

12. The method according to claim 11, wherein saving each of the plurality of content files in one of the plurality of delivery queues according to the content type of the content file comprises:

saving content files associated with the voicetrack type in the first delivery queue;

saving content files associated with the spot type in the second delivery queue;

saving content files associated with the imaging piece type in the third delivery queue; and saving content files associated with the music type in the fourth delivery queue.

13. The method according to claim 11, further comprising:

receiving a new priority level:delivery queue pair; and setting the priority level of the corresponding delivery queue to the new priority level.

14. The method according to claim 10, further comprising:

receiving an additional content file, the additional content file associated with one of the plurality of content types;

saving the additional content file in one of the plurality of delivery queues according to the content type of the additional content file; and delivering, over the one or more networks to one or more of the affiliate systems, the additional content file, wherein the additional content file is inserted in the transmission order based on the priority level of the delivery queue the additional content file is saved in.

15. The method according to claim 10, further comprising:

delivering, over the one or more networks to one or more of the affiliate systems, a station transmission log directing the one or more of the affiliate systems to play a certain content file of the plurality of content files;

receiving a station receiver log from one or more of the affiliate systems indicating either the certain content file was aired or the certain content file was not aired; and updating a station affidavit record to indicate that either the certain content file was aired by one or more of the affiliate systems or the certain content file was not aired by one or more of the affiliate systems.

16. The method according to claim 15, wherein the station transmission log directs the one or more of the affiliate systems to play the certain content file at a certain time.

17. A non-transitory computer-readable medium having stored thereon sequences of instructions, the sequences of instructions including instructions which when executed by one or more processors causes the one or more processors to perform:

receiving a plurality of content files, each of the plurality of content files associated with one of a plurality of content types;

receiving a prioritization scheme that details an arrangement of a plurality of delivery queues with priority levels;

setting the priority levels of the delivery queues based on the prioritization scheme;

saving each of the plurality of content files in one of a plurality of delivery queues according to the content type of the content file, each delivery queue having a priority level; and delivering, over one or more networks to one or more affiliate systems, the plurality of content files saved in the plurality of delivery queues, the transmission order of the plurality of content files based on the priority levels of the delivery queues.

18. The non-transitory computer-readable medium according to claim 17, further having stored thereon a sequence of instructions for causing the one or more processors to perform:

receiving a new priority level:delivery queue pair; and setting the priority level of the corresponding delivery queue to the new priority level.

19. The non-transitory computer-readable medium according to claim 17, further having stored thereon a sequence of instructions for causing the one or more processors to perform:

accessing a configuration file to identify the content type of the content files, the configuration file saving a mapping of file directories that store the content files.

20. The non-transitory computer-readable medium according to claim 17, further having stored thereon a sequence of instructions for causing the one or more processors to perform:

receiving an additional content file, the additional content file associated with one of the plurality of content types;

saving the additional content file in one of the plurality of delivery queues according to the content type of the additional content file; and delivering, over the one or more networks to one or more of the affiliate systems, the additional content file, wherein the additional content file is inserted in the transmission order based on the priority level of the delivery queue the additional content file is saved in.

* * * * *